O. M. JORSTAD.
CATENARY SUSPENSION SYSTEM.
APPLICATION FILED DEC. 7, 1920.
1,427,393.
Patented Aug. 29, 1922.
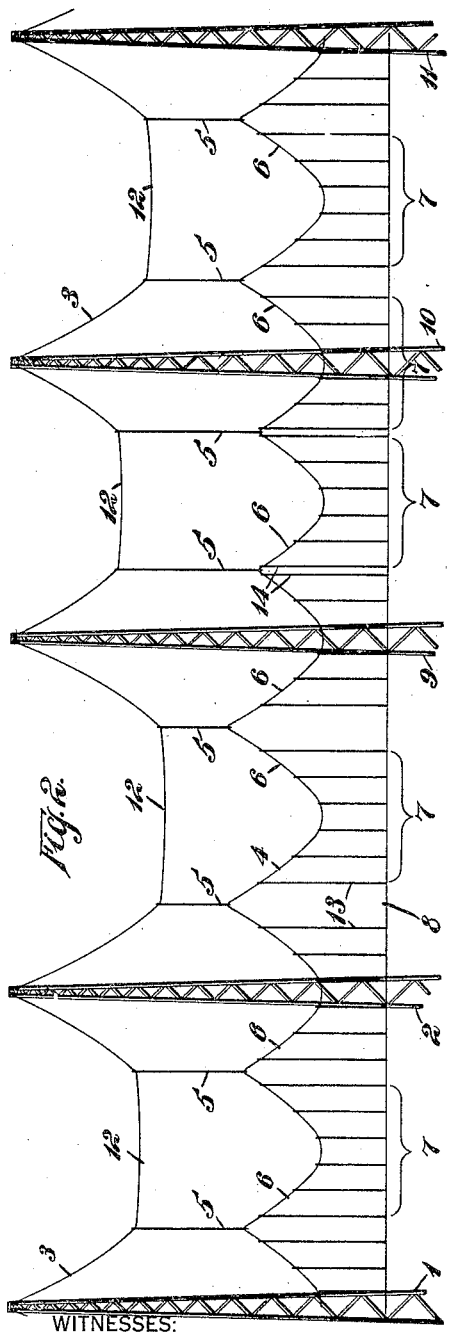
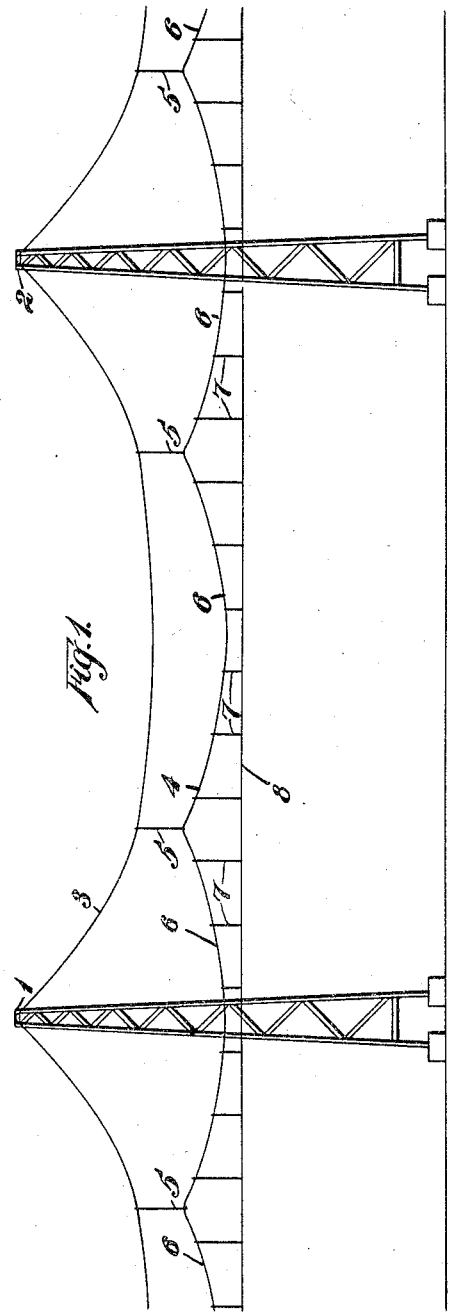

UNITED STATES PATENT OFFICE.

OSMUND M. JORSTAD, OF EAST PITTSBURGH, PENNSYLVANIA, ASSIGNOR TO WESTINGHOUSE ELECTRIC & MANUFACTURING COMPANY, A CORPORATION OF PENNSYLVANIA.

CATENARY-SUSPENSION SYSTEM.

1,427,393. Specification of Letters Patent. Patented Aug. 29, 1922.

Application filed December 7, 1920. Serial No. 428,854.

*To all whom it may concern:*

Be it known that I, OSMUND M. JORSTAD, a citizen of the United States, and a resident of East Pittsburgh, in the county of Allegheny and State of Pennsylvania, have invented a new and useful Improvement in Catenary-Suspension Systems, of which the following is a specification.

My invention relates to catenary-suspension systems and particularly to such systems as are adapted to support trolley conductors.

The object of my invention is to provide a system of the above indicated character that shall reduce the variety of parts required therein and that shall render the system more readily adaptable to varied location conditions.

Heretofore, it has been usual to provide trolley-conductor catenary systems with messenger cables and groups of sets of hangers disposed at each catenary curve to support the conductors.

Since the greater portion of a railway line usually permits supporting towers and bridges to be uniformly spaced apart, the droop or catenary curve of the messenger cable adapts itself to many of such sets or groups of hangers that are interchangeable with each other. But, in many instances, such as where the line traversed is of irregular character, or at the end of a series of supporting towers, it is not feasible to place the towers equal distances from each other. In such places, where the towers are unequally spaced, the curvature of the messenger cable is different from that on the straightaway portion or portions, thereby necessitating the use of special sets of conductor hangers.

In practicing my invention, I provide a conductor-supporting system in which the catenary curves of a secondary messenger cable are all of substantially the same curvature but may be of different lengths to compensate for the distances between the towers. This arrangement permits the use of identical sets of conductor hangers throughout the system and avoids the necessity for special sets of hangers.

Further, a main messenger cable is so arranged to connect the secondary cable to the towers as to compensate for differences in the weight of the system, caused by variations in the distances between the towers and to equalize or balance the load forces on the towers.

Figure 1 of the accompanying drawing is a diagrammatic view of a portion of a suspension system, in substantially its natural proportions, embodying my invention and Fig. 2 is a distorted similar view, but of greater scope, of a system in which the salient features of my invention are more clearly shown.

As shown in Fig. 1, a catenary-suspension system, of my invention, embodies, in general and in common with certain systems of the prior art, a plurality of spaced towers 1 and 2 from which a main messenger cable 3 is suspended. A secondary messenger cable 4 is suspended, by sections of cable or other means, constituting hangers 5, from the main messenger cable 3 and is disposed in the form of a series of catenary-curve or undulate sections 6. A set of hangers 7 is operatively connected between each section 6 of the cable 4 and a trolley conductor 8.

Where the towers are equally spaced apart, the portions of the messenger cables 3 and 4, between any pair of towers, may be similar in form and dimensions to corresponding portions between any other pair, thus permitting the curved sections 6 of the cable 4 to have identical curvature and to be adapted for the reception of identical sets of hangers 7. In other words, each hanger of each of the sets 7 may be interchangeable with the corresponding hanger of any of the other sets and have the same relative spacing along the conductor with respect to the other hangers of any set in which it is located.

By my invention, the principles above explained as being true of equally spaced towers, is applied to systems wherein the towers are not all equally spaced.

As shown in Fig. 2, in which similar parts are designated by similar reference numerals, a series of towers 1, 2, 9, 10 and 11 may be equally or unequally spaced in any desired manner. In this form, the undulate curved sections 6 of the cable 4 are arranged to be of substantially identical curvature, irrespective of the distances between the towers, and supported at their points of intersection by the hangers 5. Being of substantially identical curvature or contour, the sections 6 are each adapted to receive a set of the hangers 7 that is identical, in each of its several members, with all of the other sets.

The main messenger cable 3 is suitably arranged, as by having mid sections 12, between adjacent towers, of predetermined altitude, to compensate for difference in the load force on each side of each tower and to, thereby, substantially equalize the lateral stresses on the towers.

While the individual members of each set of hangers 7 are uniformly spaced along the conductor 8, with respect to each other, the sets, as groups, may be variously spaced in accordance with the distances between the towers adjacent to which they are disposed. The varied spacing between the outside hangers of the several groups or sets 7 is shown clearly by pairs 13 and 14 thereof, one hanger of each pair of which belongs to a different set.

While I have shown and described my invention in its preferred form, it is to be understood that it is susceptible of various modifications by those skilled in the art without departing from the spirit and scope thereof, as set forth in the appended claims.

I claim as my invention:—

1. A conductor-suspension system comprising a plurality of supporting structures and a messenger cable supported thereby and constructed of a series of undulate sections of substantially identical form but of predetermined lengths to compensate for the distances between said supporting structures.

2. A conductor-suspension system comprising a plurality of supporting structures and a messenger cable supported thereby and constructed of a series of curved sections of substantially identical curvature but of predetermined lengths to compensate for the distances between said supporting structures.

3. A conductor-suspension system comprising a plurality of supporting structures and a messenger cable supported thereby and constructed of a series of catenary-curve sections of substantially identical curvature but of predetermined lengths to compensate for the distances between said supporting structures.

4. A catenary-suspension system comprising a plurality of supporting structures, a messenger cable supported thereby, a conductor and a plurality of interchangeable sets of hangers connecting the conductor to the cable, the hangers of each set being spaced the same distances relative to each other along the conductor, irrespective of variations above a predetermined limit in the distances between the said supporting structures.

5. A conductor-suspension system comprising a plurality of supporting structures, a messenger cable supported thereby and disposed in the form of a series of undulate sections of substantially identical shape but of predetermined lengths to compensate for the distances between said supporting structures and a plurality of interchangeable sets of hangers connecting the conductor to the cable.

6. A conductor-suspension system comprising a plurality of supporting structures, a messenger cable supported thereby and disposed in the form of a series of catenary curves of substantially the same curvature but of predetermined lengths to compensate for the distances between said supporting structures and a plurality of interchangeable sets of hangers connecting the conductor to the cable.

7. A conductor-suspension system comprising a plurality of supporting structures, a secondary messenger cable disposed in the form of a series of undulate sections of substantially identical shape but of predetermined lengths to compensate for the distances between said supporting structures and a main messenger cable for connecting the secondary cable to said supporting structures and disposed in accordance with the lengths of said sections to compensate for the load forces on said supporting structure.

8. A conductor-suspension system comprising a plurality of supporting structures, a secondary messenger cable disposed in the form of a series of undulate sections of substantially identical shape but of predetermined lengths to compensate for the distances between said supporting structures, a plurality of interchangeable sets of hangers connecting the conductor to the cable and a main messenger cable for connecting the secondary cable to said supporting structures and disposed in accordance with the lengths of said sections to compensate for the load forces on said supporting structures.

9. A conductor-suspension system comprising a plurality of supporting structures, a secondary messenger cable disposed in the form of a series of undulate sections of predetermined lengths to compensate for the distances between said supporting structures, a main messenger cable supported by said supporting structures and disposed in accordance with the lengths of said sections to compensate for the load forces on said supporting structures and a plurality of hangers for connecting the main and secondary cables.

10. A conductor-suspension system comprising a plurality of supporting structures, a secondary messenger cable disposed in the form of a series of undulate sections of substantially identical shape but of predetermined lengths to compensate for the distances between said supporting structures and a main messenger cable operatively connected between the supporting structure and the secondary cable in the form of a series of undulate sections having altitudes in accordance with the lengths of the sections of the secondary cable to compensate for the load forces on said supporting structure.

11. A conductor-suspension system comprising a messenger-cable structure formed as a plurality of undulate sections of substantially identical contour but of different lengths having corresponding portions equi-distant from the conductor and the intersections of the sections of which determine the points of support therefor.

12. A conductor-suspension system comprising a plurality of supporting structures, a secondary messenger-cable structure formed as a plurality of undulate sections of substantially identical contour but of different lengths having corresponding portions equi-distant from the conductor the intersections of said sections determining the points of support therefor, and a main messenger-cable structure suspended from and between said supporting structures in the form of a plurality of undulate sections and connected to the secondary cable at said points of support, the bottom portions of the main messenger cable being disposed at distances from the conductor in accordance with the distances between the supporting structures.

In testimony whereof, I have hereunto subscribed my name this 30th day of November 1920.

OSMUND M. JORSTAD.